United States Patent
Nabar et al.

(10) Patent No.: US 9,742,476 B2
(45) Date of Patent: Aug. 22, 2017

(54) UPLINK TRAINING FOR MIMO IMPLICIT BEAMFORMING

(71) Applicant: MARVELL WORLD TRADE LTD., St. Michael (BB)

(72) Inventors: Rohit U. Nabar, Sunnyvale, CA (US); Hongyuan Zhang, Fremont, CA (US); Sudhir Srinivasa, Campbell, CA (US); Xiayu Zheng, San Jose, CA (US)

(73) Assignee: MARVELL WORLD TRADE, LTD., St. Michael (BB)

( * ) Notice: Subject to any disclaimer, the term of this patent is extended or adjusted under 35 U.S.C. 154(b) by 0 days.

(21) Appl. No.: 15/094,535

(22) Filed: Apr. 8, 2016

(65) Prior Publication Data
US 2016/0226565 A1  Aug. 4, 2016

Related U.S. Application Data

(63) Continuation of application No. 14/543,055, filed on Nov. 17, 2014, now Pat. No. 9,312,939, which is a
(Continued)

(51) Int. Cl.
*H04K 1/10* (2006.01)
*H04L 27/28* (2006.01)
(Continued)

(52) U.S. Cl.
CPC ......... *H04B 7/0417* (2013.01); *H04B 7/0617* (2013.01); *H04B 7/0619* (2013.01);
(Continued)

(58) Field of Classification Search
CPC .. H04B 7/0417; H04B 7/0626; H04B 7/0634; H04B 7/0617
(Continued)

(56) References Cited

U.S. PATENT DOCUMENTS 7,876,715 B1   1/2011   Jin et al.
8,644,368 B1   2/2014   Zhang et al.
(Continued)

FOREIGN PATENT DOCUMENTS

JP   2006-135674 A   5/2006
JP   2008-510381 A   4/2008
(Continued)

OTHER PUBLICATIONS

IEEE Std P802.11-REVma/06.0, (Revision of IEEE Std 802.11-1999) "Unapproved Draft Standard for Information Technology—Telecommunications and information exchange between systems—Local and metropolitan area network-Specific requirements Part 11: Wireless LAN Medium Access Control (MAC) and Physical Layer (PHY) specifications," (This document reflects the combining of the 2003 Edition of 802.11 plus the 802.11 g, 802.11 h, 802.11 i and 802.11j Amendments) (Superseded by P802.11-REVma_D7.0), pp. 1-1212 (2006).

(Continued)

*Primary Examiner* — Tanmay Shah

(57) ABSTRACT

In a method for beamforming in a multiple input multiple output (MIMO) communication system, a data unit is received from a communication device via a MIMO communication channel, and it is determined whether the data unit satisfies one or more selection criteria. Further, when it is determined that the data unit satisfies the one or more selection criteria, the data unit is selected to be used in developing a steering matrix for transmitting data units to the communication device.

22 Claims, 5 Drawing Sheets

Related U.S. Application Data continuation of application No. 13/491,541, filed on Jun. 7, 2012, now Pat. No. 8,891,640.

(60) Provisional application No. 61/499,432, filed on Jun. 21, 2011.

(51) Int. Cl.
    *H04B 7/0417* (2017.01)
    *H04B 7/06* (2006.01)

(52) U.S. Cl.
    CPC ......... *H04B 7/0626* (2013.01); *H04B 7/0634* (2013.01); *H04B 7/063* (2013.01); *H04B 7/0632* (2013.01)

(58) Field of Classification Search
    USPC ........................................................ 375/267
    See application file for complete search history.

(56) References Cited

U.S. PATENT DOCUMENTS

| | | | |
|---|---|---|---|
| 8,848,816 B2 | 9/2014 | Sridhara et al. | |
| 8,891,597 B1 | 11/2014 | Zhang et al. | |
| 8,891,640 B2 | 11/2014 | Nabar et al. | |
| 8,971,178 B1 | 3/2015 | Nabar et al. | |
| 2007/0206504 A1 | 9/2007 | Koo et al. | |
| 2009/0046800 A1* | 2/2009 | Xu ....................... | H04B 7/0617 375/267 |
| 2009/0196163 A1 | 8/2009 | Du | |
| 2009/0252250 A1 | 10/2009 | Heath et al. | |
| 2010/0054223 A1 | 3/2010 | Zhang et al. | |
| 2010/0056062 A1 | 3/2010 | Zhang et al. | |
| 2010/0104038 A1 | 4/2010 | Stager et al. | |
| 2010/0172425 A1 | 7/2010 | Pare, Jr. et al. | |
| 2010/0309834 A1 | 12/2010 | Fischer et al. | |
| 2011/0002219 A1 | 1/2011 | Kim et al. | |

FOREIGN PATENT DOCUMENTS

| | | |
|---|---|---|
| JP | 2011-501906 A | 1/2011 |
| JP | 2011-517373 A | 6/2011 |
| WO | WO-2010/027865 A2 | 3/2010 |

OTHER PUBLICATIONS

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, pp. 1-1184 (Jun. 12, 2007).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 Ghz Band," *The Institute of Electrical and Electronics Engineers, Inc.*, pp. 1-83 (Sep. 1999).

IEEE Std 802.11ac/D2.0 "Draft Standard for Information Technology—Telecommunications and information exchange between systems—Local and metropolitan area networks-Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).

IEEE Std 802.11ac/D2.1 "Draft Standard for Information Technology—Telecommunications and information exchange between systems—Local and metropolitan area networks-Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).

IEEE Std 802.11ac/D3.0 "Draft Standard for Information Technology—Telecommunications and information exchange between systems—Local and metropolitan area networks-Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).

IEEE Std 802.11ac/D4.0 "Draft Standard for Information Technology—Telecommunications and information exchange between systems—Local and metropolitan area networks-Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).

IEEE Std 802.11ac/D5.0 "Draft Standard for Information Technology—Telecommunications and information exchange between systems—Local and metropolitan area networks-Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).

IEEE Std 802.11ac/D6.0 "Draft Standard for Information Technology—Telecommunications and information exchange between systems—Local and metropolitan area networks-Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).

IEEE P802.11nTM/D3.00, "Draft Standard for Information Technology—Telecommunications and information exchange between systems—Local and metropolitan area networks-Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks-Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, pp. 1-69 (Apr. 2003).

IEEE Std 802.16-2009 (Revision of IEEE Std. 802.16-2004), IEEE Standard for Local and metropolitan area networks: Part 16: Air Interface for Broadband Wireless Access Systems, *The Institute of Electrical and Electronics Engineers, Inc.*, 2082 pages (May 29, 2009).

IEEE Std 802.16e-2005 and IEEE Std 802.16-2004/Cor1-2005 (Amendment and Corrigendum to IEEE Std 802.16-2004), IEEE Standard for Local and metropolitan area networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1, *The Institute of Electrical and Electronics Engineers, Inc.*, pp. 1-864 (Feb. 28, 2006).

IEEE Std. 802.11n™ "IEEE Standard for Information Technology—Telecommunications and information exchange between systems—Local and metropolitan area networks-Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

(56) References Cited

OTHER PUBLICATIONS

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, pp. 1-512 (1999).
Ansari, et al., "Unified MIMO Pre-Coding Based on Givens Rotation," *The Institute of Electrical and Electronics Engineers*, doc. No. IEEE C802.16e-04/516r2, pp. 1-13, (Jan. 11, 2005).
Chen, "Home Network Basis: Transmission Environments and Wired/Wireless Protocols," *Prentice Hall*, pp. 1-26 (Jul. 2003).
Cisco, "Cisco Clientlink: Optimized Device Performance with 802.11 n" (2009).
Fisher et al., "Link Adaptation Subfield for VHT," doc. No. IEEE 802.11-10/1095r0, IEEE 802.11-10, 123rd IEEE 802.11 Wireless Local Area Networks session, Interim Meeting Session, Hilton Waikoloa Village, pp. 1-5 (Sep. 12, 2010).
Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).
Hiertz, et al., "The IEEE 802.11 Universe," *IEEE Communications Magazine*, pp. 62-70, (Jan. 2010).
Love et al., "An Overview of Limited Feedback in Wireless Communication Systems," IEEE J. on Selected Areas in Communications, vo. 26, No. 8, pp. 1341-1365 (Oct. 2008).
Merlin et al., "VHT Control and Link Adaptation," doc. No. IEEE 802.11-11/0040r0, IEEE 802.22-11, 125th IEEE 802.11 Wireless Local Area Networks Session, Interim Meeting Session, Hyatt Century Plaza Hotel, Los Angeles, California, pp. 1-15 (Jan. 18, 2011).
Mujtaba, S.A. "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).
Perahia, et al., "Gigabit Wireless LANs: an overview of IEEE 802.11ac and 80211ad," ACM SIGMOBILE Mobile Computing and Communications Review, vo. 15, No. 3, pp. 23-33 (Jul. 2011).
Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).
Stacey et al., "Specification Framework for TGac," document No. IEEE 802.11-09/0992r20, *Institute for Electrical and Electronics Engineers*, pp. 1-49, (Jan. 18, 2011).

van Nee, et al. "The 802.11n MIMO-OFDM Standard for Wireless LAN and Beyond," Wireless Personal Communications, vol. 37, pp. 445-453 (Jun. 2006).
Zhang et al., "11ac Explicit Sounding and Feedback", *The Institute of Electrical and Electronics Engineers*, doc. No. IEEE 802.11-10/1105r0, 44 pages (Sep. 2010).
Zhang et al., "VHT Link Adaptations," doc. No. IEEE802.11-11/0047r0, IEEE 802.11-11, 125th IEEE 802.11 Wireless Local Area Networks Session, Interim Meeting Session, Hyatt Century Plaza Hotel, Los Angeles, California, pp. 1-11 (Jan. 18, 2011).
IEEE 802.20-PD-06; IEEE P 802.20™ v14, Draft 802.20 Permanent Document; <System Requirements for IEEE 802.20 Mobile Broadband Wireless Access Systems—Version 14>, 24 pages (Jul. 16, 2004).
ITU-T Recommendation G.9960, "Unified high-speed wireline-based home networking transceivers—System architecture and physical layer specification," *Int'l Telecommunication Union*, pp. 1-160 (Dec. 2011).
ITU-T Recommendation G.9960, Erratum 1 to Recommendation ITU-T G.9960, *Int'l Telecommunication Union*, 1 page (Jul. 2012).
ITU-T Recommendation G.9960, Erratum 2 to Recommendation ITU-T G.9960, *Int'l Telecommunication Union*, 4 pages (Sep. 2012).
ITU-T Recommendation G.9963, "Unified high-speed wireline-based home networking transceivers—Multiple input-multiple output specification" *Int'l Telecommunication Union*, pp. 1-90 (Dec. 2011).
Brown, "G.hn: Draft text for G.9960 (2010) corrigendum 1," *International Telecommunication Union*, pp. 1-184 (Feb. 2011).
International Search Report and Written Opinion for PCT/US2012/041423, mailed Sep. 6, 2012.
International Preliminary Report on Patentability in related International Application No. PCT/US2012/041423, dated Dec. 23, 2013 (8 pages).
Notice of Reasons for Rejection in Japanese Application No. 2014-517005, dated Jan. 26, 2016, with English translation (4 pages).
First Office Action in Chinese Application No. 2012800391979, dated Feb. 3, 2016, with English translation (11 pages).
Office Action in Chinese Patent Application No. 2012800391979, dated Oct. 11, 2016, with English translation (9 pages).
Communication Pursuant to Article 94(3) EPC in European Patent Application No. 12730297.4, dated Feb. 21, 2017 (6 pages).
Office Action in Chinese Patent Application No. 201280039197.9, dated Mar. 30, 2017, with English translation (7 pages).

* cited by examiner

UPLINK TRAINING FOR MIMO IMPLICIT BEAMFORMING

CROSS-REFERENCES TO RELATED APPLICATIONS

This application is a continuation of U.S. application Ser. No. 14/543,055, now U.S. Pat. No. 9,312,939, entitled "Uplink Training for MIMO Implicit Beamforming," filed Nov. 17, 2014, which is a continuation of U.S. application Ser. No. 13/491,541, now U.S. Pat. No. 8,891,640, entitled "Uplink Training for MIMO Implicit Beamforming," filed Jun. 7, 2012, which claims the benefit of U.S. Provisional Patent Application No. 61/499,432, entitled "Uplink Training Methods for MIMO Implicit Beamforming," filed on Jun. 21, 2011. The applications referenced above are hereby incorporated by reference herein in their entireties.

FIELD OF TECHNOLOGY

The present disclosure relates generally to communication systems and, more particularly, to beamforming techniques use in communication systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In some wireless communication systems, one or more communication devices employ multiple antennas. Accordingly, a communication channel between two such devices can be i) a multiple-input, multiple-output (MIMO) channel when both communication devices employ multiple antennas, ii) a single-input, multiple-output (SIMO) channel when a transmitting device ("the transmitter") employs a single transmit antenna and the receiving device ("the receiver") employs multiple receive antennas, or iii) a multiple-input, single-output (MISO) channel the transmitter employs multiple transmit antennas and the receiver employs a single receive antenna. Referring for simplicity to transmit beamforming, transmission and reception properties in these systems can be improved by using each of the various transmit antennas to transmit the same signal while phasing (and amplifying) this signal as the signal is provided to the various transmit antennas to achieve beamforming or beamsteering. Generally speaking, beamforming or beamsteering creates a spatial gain pattern having one or more lobes or beams (as compared to the gain obtained by an omni-directional antenna) in one or more particular directions, while generally reducing the gain over that obtained by an omni-directional antenna in other directions. If the gain pattern is configured to produce a high gain lobe in the direction of each of the receiver antennas or in the direction of the receiver antennas in general, the MIMO system can obtain better transmission reliability between a particular transmitter and a particular receiver, over that obtained by single transmit-antenna/receive-antenna systems.

To conduct beamforming in the direction of a receiver, a transmitter generally utilizes a steering matrix determined based on specifics of the forward channel (i.e., the channel from the transmitter to the receiver) to condition the signals applied to various transmit antennas so as to produce the desired transmit gain pattern. In a technique known as explicit beamforming, to determine the specifics of the forward channel, such as the channel state information (CSI) or other measured description of the forward channel, the transmitter first sends training data to the receiver, which then determines or estimates forward channel characteristics and/or determines a steering matrix that specifies beamsteering coefficients to be used by the transmitter, and then transmits this information back to the transmitter. The transmitter, in turn, receives the forward channel information (or steering matrix) from the receiver and utilizes this information to create the desired gain pattern in subsequent transmissions to the receiver. Explicit beamforming typically uses one of three types of feedback channel descriptions, which are describe in the context of an access point (AP) and a client station for ease of explanation. With channel state information (CSI) feedback, the client station estimates the downlink channel from a sounding packet transmitted by the AP and feeds back the estimated channel gains. With uncompressed steering matrix feedback, the client station, based on the channel estimate from a sounding packet from the AP, determines the steering matrix that is to be used at the AP. The client station then feeds back this steering matrix, without compression. With compressed steering matrix feedback, a similar process occurs, but the steering matrix is fed back in a compressed form.

On the other hand, in implicit beamforming, the transmitter determines specifics of the reverse channel (the channel from the receiver to the transmitter) based on training signals that the transmitter receives from the receiver and estimates the forward channel from the reverse channel by assuming channel reciprocity.

Beamforming typically involves a protocol for transmitting training signals and feeding back CSI or beamsteering coefficients (i.e., a beamforming training protocol). Some communication devices, however, do not support beamforming training protocols and therefore cannot explicitly participate in beamforming training. Some beamforming techniques are described in "IEEE Std. 802.11n™ IEEE Standard for Information Technology-Telecommunications and information exchange between systems-Local and metropolitan area networks-Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, October 2009, and such techniques are hereby incorporated herein by reference.

SUMMARY

In one embodiment, a method for beamforming in a multiple input multiple output (MIMO) communication system includes receiving a data unit from a communication device via a MIMO communication channel and determining whether the data unit satisfies one or more selection criteria. The method also includes, when it is determined that the data unit satisfies the one or more selection criteria, selecting the data unit to be used in developing a steering matrix for transmitting data units to the communication device.

In other embodiments, the method includes any combination of one or more of the following elements.

Developing the steering matrix comprises developing, based on the uplink data unit, an estimate of a reverse channel via which the data unit was received, developing an estimate of a forward channel based on the estimate of the reverse channel, and developing the steering matrix to perform beamforming in the forward channel based on the estimate of the forward channel.

At least one of the one or more selection criteria is fixed.

The fixed selection criterion relates to one or more of i) a maximum number of spatial streams supported by the communication device and ii) channel bandwidth being used for transmission to the communication device.

The method further includes dynamically determining at least one selection criterion of the one or more selection criteria.

Dynamically determining the selection criterion comprises determining the selection criterion based on a signal strength associated with one or more data units received from the communication device.

Dynamically determining the selection criterion comprises determining a number X of data units (i) that were received from the communication device during a time period of duration T and (ii) that were transmitted using at least a certain number of spatial streams, and setting the selection criterion based on the number X.

Dynamically determining the selection criterion comprises determining whether the number X is greater than or equal to a number N, and setting the selection criterion based on whether the number X is greater than or equal to a number N.

At least one of i) the time period duration T and ii) the number N are adjustable.

The data unit is a non-sounding data unit.

In another embodiment, an apparatus for use in a communication system comprises a network interface configured to receive a data unit from a communication device via a multiple input multiple output (MIMO) communication channel. The network interface is also configured to determine whether the data unit satisfies one or more selection criteria. The network interface is further configured to, when it is determined that the data unit satisfies the one or more selection criteria, select the uplink data unit to be used in developing a steering matrix for transmitting data units to the communication device.

In other embodiments, the apparatus includes any combination of one or more of the following features.

The network interface is further configured to develop, based on the data unit, an estimate of a reverse channel via which the data unit was transmitted, develop an estimate of a forward channel based on the estimate of the reverse channel; and develop the steering matrix to perform beamforming in the forward channel based on the estimate of the forward channel.

At least one selection criterion of the one or more selection criteria is fixed.

The fixed selection criterion is based on one or more of i) a maximum number of spatial streams supported by the communication device and ii) channel bandwidth being used for transmission to the communication device.

The network interface is further configured to dynamically determine at least one selection criterion of the one or more selection criteria.

The network interface is configured to dynamically determine the selection criterion at least based on a signal strength associated with one or more uplink data units received from the communication device.

The network interface is configured to dynamically determine the selection criterion at least by determining a number X of data units (i) that were received from the communication device during a time period of duration T and (ii) that were transmitted using at least a certain number of spatial streams, and setting the selection criterion based on the number X.

The network interface is configured to dynamically determine the selection criterion at least by determining whether the number X is greater than or equal to a number N, and setting the selection criterion based on whether the number X is greater than or equal to a number N.

At least one of i) the time period duration T and ii) the number N of uplink data units is adjustable.

The data unit is a non-sounding data unit.

In yet another embodiment, a wireless communication system comprises a first communication device having a plurality of antennas and a first network interface, and a second communication device having a second network interface. The first network interface of the first communication device is configured to determine steering matrices for use in transmitting data from the first communication device to the second communication device via a wireless communication channel, wherein the steering matrices are determined based on data units received from the second communication device. The second network interface of the second communication device is configured to, when communicating with the first communication device using a number of spatial streams that is less than a maximum number of spatial streams supported by the second communication device, transmit, during a time period of duration T, a minimum number M of data units using the maximum number of spatial streams supported by the second communication device.

In other embodiments, the wireless communication system includes one or more of the following features.

At least one of i) the time period duration T and ii) the number M of uplink data units is adjustable.

The second network interface of the second communication device is configured to, during the time period of duration T, transmit, in accordance with a first modulation and coding scheme (MCS), data units using the maximum number of spatial streams supported by the second communication device. The first MCS corresponds to a first data rate that is lower than a second data rate corresponding to a second MCS used by the second communication device to transmit data units using the number of spatial streams that is less than the maximum number of spatial streams supported by the second communication device.

DETAILED DESCRIPTION

While the beamforming techniques described herein for processing and effecting a wireless data transmission are described as being used in communication systems that use one of the IEEE Standard 802.11 communication standards (e.g., IEEE 802.11n), these techniques may be used in various other types of wireless communication systems and are not limited to those conforming to one or more of the IEEE Standard 802.11 standards. For example, these techniques may be used in communication systems based on the IEEE 802.16e, 802.16j, or 802.16m standards (known as "WiMAX"), mobile telephony communication systems, etc.

Figure 1:
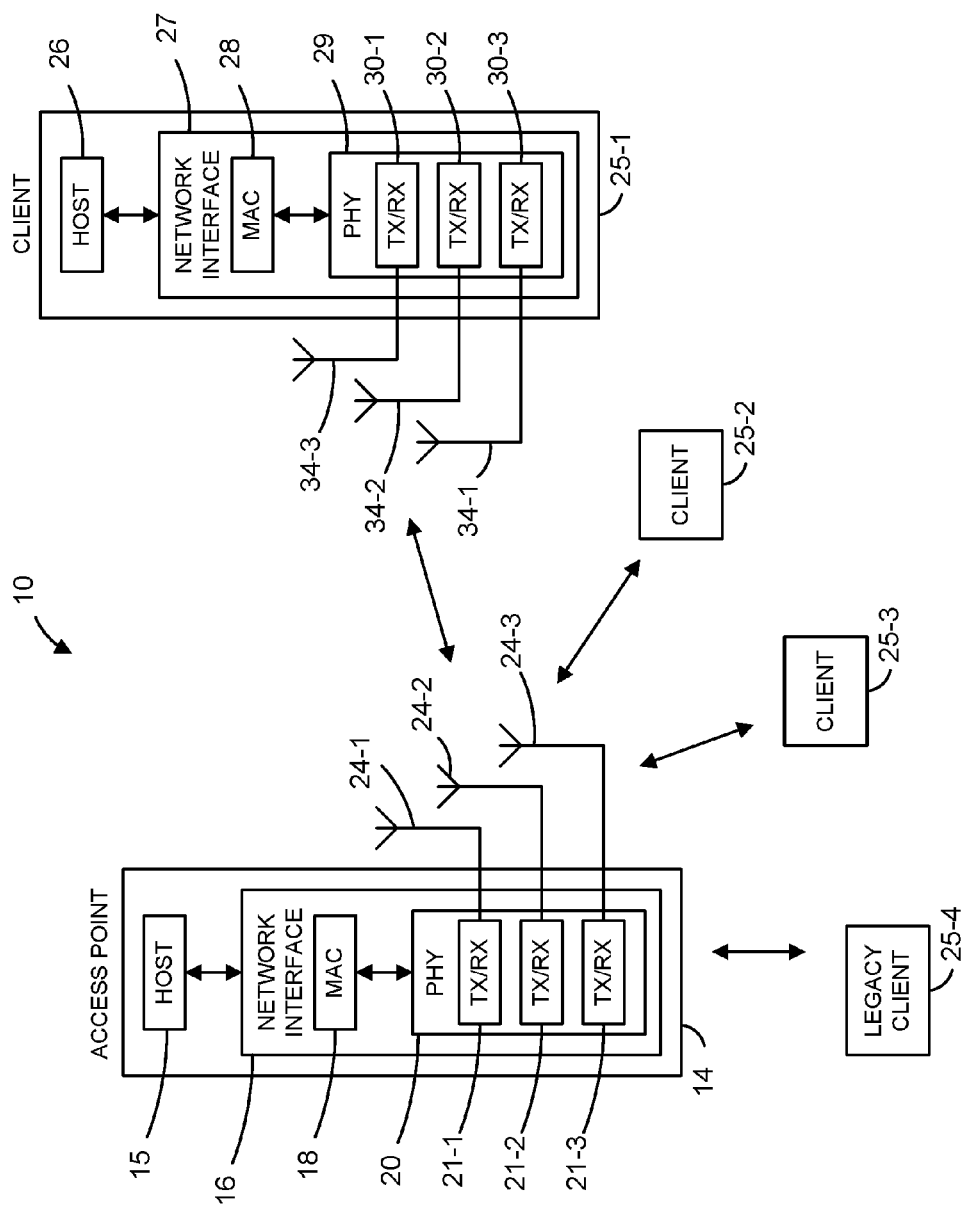
FIG. 1 is a block diagram of an example wireless local area network (WLAN) that utilizes implicit beamforming techniques such as disclosed herein, according to an embodiment.

FIG. 1 is a block diagram of an example wireless local area network (WLAN) 10 that utilizes implicit beamforming techniques such as described in the present disclosure, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 includes different numbers (e.g., 1, 2, 4, 5, etc.) of transceivers 21 and antennas 24 in other embodiments. In one embodiment, the MAC processing unit 18 and the PHY processing unit 20 are configured to operate according to a first communication protocol (e.g., the IEEE 802.11n Standard, the IEEE 802.11ac Standard (now in the standardization process), etc.) which supports certain frame exchanges and other procedures specifically related to explicit and/or implicit beamforming. In another embodiment, the MAC processing unit 18 and the PHY processing unit 20 are alternatively or additionally configured to operate according to a second communication protocol, which does not explicitly support beamforming (e.g., the IEEE 802.11g Standard, the IEEE 802.11a Standard, etc.). The second communication protocol is herein referred to as a "legacy protocol."

The WLAN 10 includes a plurality of client stations 25. Although four client stations 25 are illustrated in FIG. 1, the WLAN 10 includes different numbers (e.g., 1, 2, 3, 5, 6, etc.) of client stations 25 in various scenarios and embodiments. At least one of the client stations 25 (e.g., client station 25-1) is configured to operate at least according to the first communication protocol. The WLAN 10 also includes a client station 25-4 that is not configured to operate according to the first communication protocol but is configured to operate according to a legacy protocol, in some embodiments. Accordingly, the client station 25-4 does not explicitly support frame exchanges or other procedures specifically related to beamforming Such a client station 25-4 is referred to herein as a "legacy client station." In some embodiments and/or scenarios, the WLAN 10 includes more than one legacy client station. In other embodiments and/or scenarios, the WLAN 10 includes no legacy client stations.

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes different numbers (e.g., 1, 2, 4, 5, etc.) of transceivers 30 and antennas 34 in other embodiments.

In an embodiment, one or more of the client stations 25-2, 25-3, and 25-4 have a structure the same as or similar to the client station 25-1 (except that at least the client station 25-4 is not configured to explicitly support frame exchanges or other procedures specifically related to beamforming) In these embodiments, the client stations 25 structured the same as or similar to the client station 25-1 have the same or a different number of transceivers and antennas. For example, the client station 25-2 has only two transceivers and two antennas, according to an embodiment.

In some embodiments, the AP 14 utilizes implicit beamforming for communication with one or more of the client stations 25 in order to increase signal directivity in the direction of the client 25 and to thereby improve received signal quality (e.g., SNR) at the client station. Generally speaking, to conduct implicit beamforming, according to an embodiment, a first communication device (e.g., the AP 14) determines the CSI or other measured description of the reverse channel, i.e., the channel from a second communication device (e.g., client station 25-1) to the first communication device, from training signal(s) sent from the second communication device to the first communication device. In a "standard" implicit beamforming procedure, the first communication device transmits to the second communication device a data unit that includes a request to transmit a sounding frame (or packet) that "sounds" the reverse channel from the second communication device to the first communication device thereby allowing the first communication device to fully determine or estimate characteristics of the reverse channel. The first communication device then computes an estimate of the forward channel based on the estimate of the reverse channel by assuming channel reciprocity and, based on the forward channel estimate, generates a steering matrix specifying the beamsteering coefficients that are then applied to the signals to be transmitted to the second communication device to produce the desired transmit gain pattern at the transmitter output.

Figure 2:
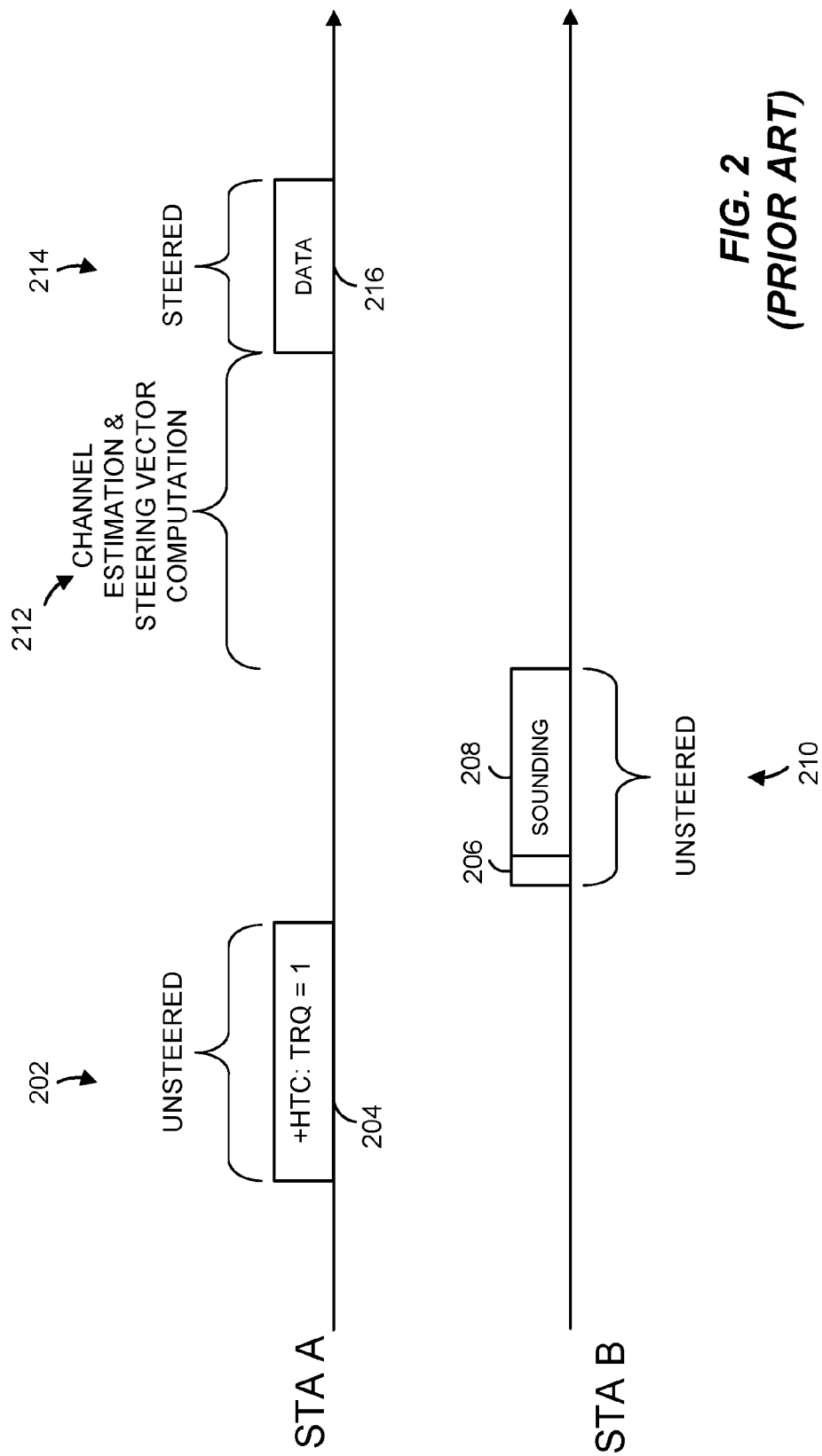
FIG. 2 is a timing diagram of a prior art implicit beamforming technique.

For explanatory purposes, FIG. 2 is a timing diagram illustrating a standard implicit beamforming technique conducted by two devices supporting implicit beamforming, such as Station A and Station B, over a MIMO communication channel. The technique illustrated in FIG. 2 is specified in the IEEE 802.11n Standard. Station A in FIG. 2 is a beamformer (i.e., a device that transmits a data unit using a steering matrix) and Station B is a beamformee (i.e., a device that receives a data unit transmitted using a steering matrix). During a time interval 202, Station A transmits a high throughput control (HTC) frame 204 that specifies a request to transmit a sounding frame (TRQ).

In response to receiving the frame 204, the implicit-beamforming-capable Station B transmits a sounding packet 208 having several training fields in a portion 206 so as to enable Station A to accurately estimate the reverse MIMO channel (i.e., the MIMO channel from Station B to Station A). In particular, as each training field is transmitted, Station B applies a different mapping of symbols to spatial streams, and the number of training fields usually corresponds to the number of spatial or space-time streams used for modulating data packets transmitted from Station B to Station A. When the sounding packet 208 is a null-data packet (NDP), the sounding packet does not include a payload. On the other hand, in a technique known as "staggered sounding," the sounding packet 208 is a data packet that generally carries payload information from Station B to Station A, but, if necessary, includes more training fields than the number of spatial or space-time streams used for transmitting data. In such situations, the extra training fields included in the sounding packet 208 allow the Station A to obtain a full dimensional channel estimate of the communication channel between Stations A and B based on a packet that does not utilize all available dimensions for the data portion of the packet. In general, the sounding packet 208 is not transmitted between Stations A and B during procedures other than the sounding procedure.

During a time interval 212, Station A estimates the MIMO channel in the direction from Station B to Station A (i.e., the reverse channel) based on the training fields of the sounding packet 208. Station A then generates an estimate of the forward channel using the estimate of the reverse channel and generates a steering vector for use in downlink transmissions. As illustrated in FIG. 2, during a time period 214, Station A transmits a data packet 64 using the steering vector generated in the interval 212.

In some embodiments, the AP 14 conducts a "non-standard" implicit beamforming procedure that is at least substantially transparent with respect to the client station 25. The AP 14 utilizes non-standard implicit beamforming to perform beamforming in a direction of the legacy client station 25-4 which does not support certain procedures related to beamforming, such as the procedure to sound a reverse communication channel, according to an embodiment. In another embodiment, the AP 14 utilizes non-standard implicit beamforming to perform beamforming in a direction of a low complexity non-legacy client station (e.g., client station 25-1) which, similarly, does not explicitly support beamforming According to an embodiment, to conduct implicit beamforming transparently with respect to a client station (e.g., the client station 25-1), the AP 14 determines an estimate of the reverse channel (e.g., the channel from the client station 25-1 to the AP 14) based on a data unit received from the client station 25-1, wherein the received data unit is not specifically related to beamforming (e.g., a non sounding data unit, also referred to herein as a "regular" data unit). More specifically, in this embodiment, the AP 14 receives from the client station 25-1 a regular data unit that does not specifically sound the channel but nonetheless includes training signals (e.g., in a preamble) that allow the AP 14 to determine or estimate characteristics of the reverse channel Similar to standard implicit beamforming, the AP 14 then computes an estimate of the forward channel from the estimate of the reverse channel by assuming channel reciprocity, and, based on the forward channel estimate, computes a steering matrix to be used for beamforming in the direction of the client station 25-1, according to an embodiment.

Figure 3:
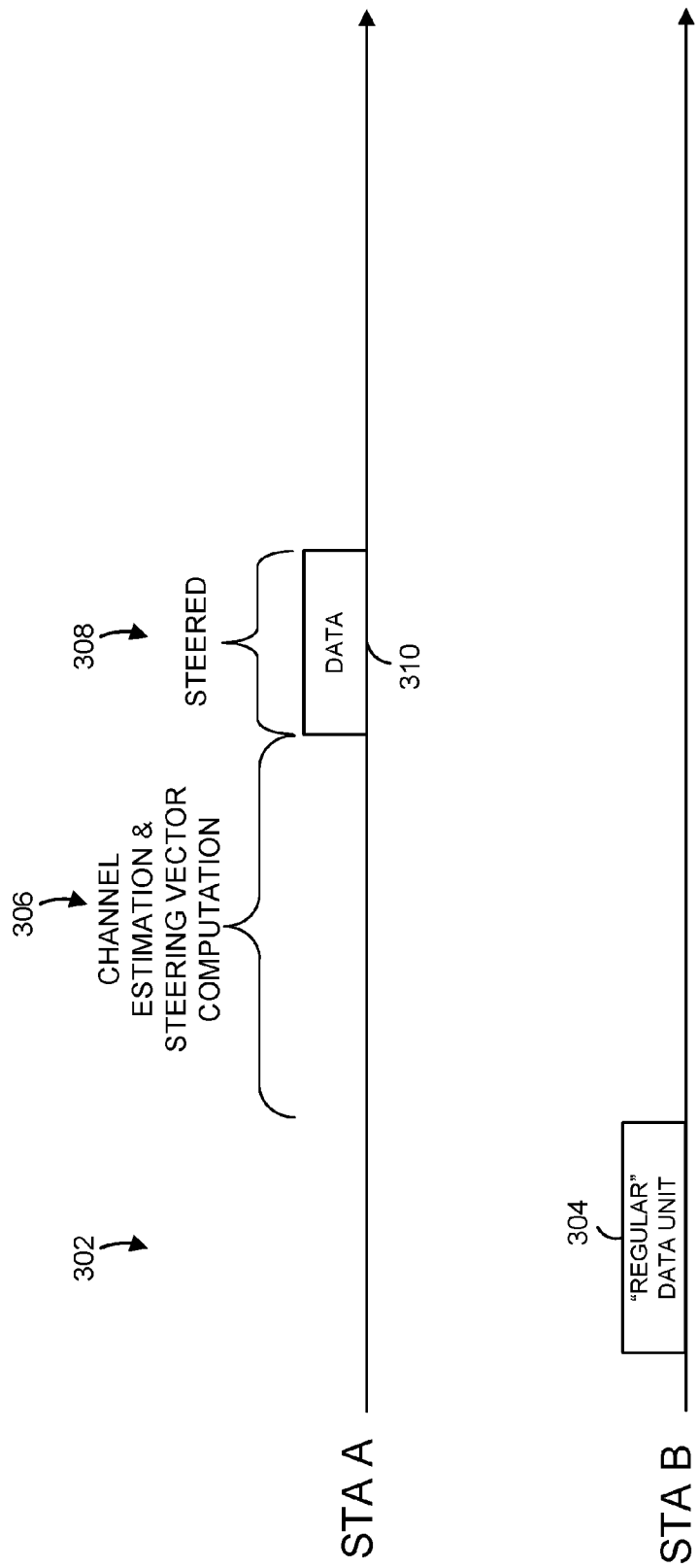
FIG. 3 is a timing diagram of an implicit beamforming technique in accordance with an embodiment of the present disclosure.

FIG. 3 is a timing diagram illustrating one example of a non-standard implicit beamforming technique, according to an embodiment. In FIG. 3, Station A is a beamformer and Station B is a beamformee. Referring to FIG. 1, in one embodiment, the AP 14 is the beamformer (Station A), and the client station 25-1 is the beamformee (Station B). In another embodiment, the client station 25-1 is the beamformer (Station A), and the AP 14 is the beamformee (Station B).

As illustrated in FIG. 3, during the time interval 302, Station B transmits a regular data unit 304 to Station A. As used herein, a regular data unit is a non-sounding data unit used in any procedure other than channel sounding, e.g., data exchange, modulation and coding scheme (MCS) feedback, etc., and the data unit 304 is a communication frame, a data packet, etc. According to an embodiment, the data unit 304 is not transmitted in response to a request to transmit a sounding packet. Station B transmits the data unit 304 for a purpose unrelated to sounding the MIMO channel, in an embodiment. For example, in an embodiment, the data unit 304 is a data packet that includes a data payload and a number of training fields corresponding to the number of spatial or space-time streams used for transmitting the payload. In general, in at least some embodiments, the implicit beamforming procedure of FIG. 3 is conducted transparently with respect to the Station B.

During time interval 306, Station A estimates the reverse channel between Stations A and B based on the training signals included in the data unit 304, estimates the forward channel using the estimate of the reverse channel, and determines a steering matrix to be used in transmitting a data unit 310 to Station B during a time interval 308. In some embodiments, the regular data 304 includes training data that allows Station A to only partially estimate the reverse channel. In one such embodiment, for example, Station B includes three antennas but transmits the data unit 304 to Station A via only two of the antennas (i.e., via two spatial streams). In this case, in some situations, the data unit 304 includes training signals that allow Station A to only determine a partial channel estimate (in this case at most a two dimensions out of a possibility of three). Accordingly, in this embodiment, in at least some situations, Station A utilizes a partial channel estimate to generate a steering matrix which provides at least some channel directivity in the direction Station B.

With continued reference to FIG. 3, in mathematical terms, according to an embodiment, a signal received by Station B from Station A is represented as:

$$y_B = H_{AB} Q_{steer} s_A + n \qquad \text{Equation 1}$$

where $s_A$ is a $N_{ss} \times 1$ dimensional vector representing the signal transmitted by Station A, $y_B$ is an $N_{rx} \times 1$ dimensional vector representing the signal received by Station B, n is a suitable $N_{RX} \times 1$ dimensional vector representation of additive noise, $H_{AB}$ is a $N_{RX} \times N_{TX}$ dimensional matrix representation of the forward channel from Station A to Station B, and $Q_{steer}$ an $N_{TX} \times N_{SS}$ dimensional spatial mapping matrix applied to the transmitted signal $s_A$ to steer the transmission of the signal $s_A$ from Station A in the direction of Station B (where $N_{TX}$ is the number of transmit antennas at Station A, $N_{RX}$ is the number of receive antennas at Station B, and $N_{ss}$ is the number of spatial or space-time streams used for transmitting the signal $s_A$). In various embodiments and/or scenarios, Station A computes the spatial mapping matrix $Q_{steer}$ in accordance with non-standard implicit beamforming techniques described herein.

In some such embodiments and/or scenarios, Station A obtains channel state information (CSI) that describes one or more characteristics of the one or more spatial streams associated with the reverse channel (e.g., the gain, the phase, the signal to noise ratio (SNR), etc.) based on a data unit received from Station B (e.g., the data unit 304 of FIG. 3). Continuing with the mathematical model of Equation 1, the CSI corresponding to the reverse channel is represented in a matrix format, according to one embodiment, as a two-dimensional channel matrix $H_{BA}$ corresponding to the reverse from Station B to Station A that specifies, in each element, a channel gain parameter for a spatial stream defined by the corresponding transmit antenna (at Station B) and a receive antenna (at Station A). To generate an estimate of the forward channel (e.g., $H_{AB}$ of Equation 1), Station A calculates the transpose of the matrix $H_{BA}$ that describes the reverse channel. In doing so, Station A assumes that the MIMO channel between Stations A and B is symmetrical so that the forward channel and the reverse channel can be considered to be reciprocal.

However, channel estimation is typically conducted at baseband, and therefore, according to an embodiment, the observed channel contains the equivalent RF responses of the transmit and the receive chains which, according to an embodiment, are not identical in the same device (e.g., Station A). In this embodiment, channel reciprocity of the forward and reverse channels between Stations A and B is therefore impaired. To reduce or account for the errors introduced by RF chain impairments in an implicit beamforming technique, in one embodiment, Station A does not assume complete reciprocity and generates a calibration matrix to be applied to the signals to be transmitted (i.e., the output signals) during the beamforming process to compensate for measured differences between the actual forward and reverse channels.

In particular, according to an embodiment, Station A first determines a calibration matrix that at least partially compensates for RF impairments caused by transmit and receive chain imbalance in Station A. Then, each time a new steering matrix is to be calculated for the forward channel, the beamforming technique applies the calibration matrix to a steering matrix determined using an implicit beamforming technique, so that, once the calibration matrix is determined, the transmitter performs implicit beamforming using a measured description of the reverse channel to produce an estimate of the forward channel. Alternatively, in some embodiments, Station A calculates calibration matrices for its receive chains, so that once the correction matrix is determined, Station A applies the calibration matrices to the reverse channel estimation to generate a compensated reverse channel estimate, and generates a forward channel estimate using the compensated reverse channel estimate to use in transmit beamforming. In general, a communication device develops a calibration matrix by conducting channel estimation of the forward channel, receiving channel estimation information corresponding to the forward channel from a peer device (via a feedback message, for example), and using the two estimates to generate a matrix that would restore reciprocity to the MIMO channel. However, in some embodiments in which Station B does not support channel estimation feedback and/or other calibration procedures, and Station A generates the calibration matrix by conducting a self-calibration technique.

Because wireless communication channels are often characterized by time-varying conditions due to factors such as fading, shielding, interference and user mobility, in an embodiment, a steering matrix determined based on channel characteristics of the communication channel between Station A and Station B is frequently updated based on the current characteristics of the communication channel. On the other hand, the calibration procedure is conducted infrequently, compared with steering matrix updates, according to some embodiments. For example, in one embodiment, the calibration procedure is conducted only upon association of the device into the network, upon switching to a new channel, or upon changes in the environment (e.g. a change in temperature).

When conducting implicit beamforming, Station A generally updates the steering matrix for station B based on every uplink data unit that Station A receives from station B, in an embodiment. As discussed above, in at least some situations, an uplink data unit includes a number of training fields corresponding to the number of spatial or space-time streams used for transmitting the uplink data unit that allows Station A to obtain only a partial estimate of the communication channel, according to an embodiment. In some cases, in this embodiment, the partial estimate is insufficient to achieve desired directivity in the direction of Station B. In some such situations, updating a steering matrix based on such partial channel estimate results in degradation in performance compared to performance that is achieved using an older channel estimate that includes more dimensions. Further, in some situations, if an uplink data unit is transmitted using a smaller channel bandwidth compared to channel bandwidth used for transmitting downlink data units from Station A to Station B, then a steering matrix determined based on the smaller bandwidth uplink data unit does not provide directivity in the entire frequency band of the downlink communication channel. In such situations, the computed steering matrix at most provides directivity in the frequency band corresponding to the channel in which the uplink data unit traveled, according to an embodiment.

To represent partial channel estimation in mathematical terms, according to an embodiment, it is assumed that an uplink data unit is transmitted using multiple spatial streams through the use of an uplink spatial mapping matrix $Q_{UL}$ having dimensions of $N_T \times N_{STS\_UL}$, where here $N_T$ is the number of transmit antennas at the beamformer, and $N_{STS\_UL}$ is the number of spatial streams (and a corresponding number of training fields) associated with the uplink data unit. This data unit allows estimation of the equivalent uplink channel represented by the expression $H_{UL}Q_{UL}$, where $H_{UL}$ is a full dimensional ($N_T \times N_R$) channel matrix representing the reverse communications channel (i.e., the communication channel from the beamformee to the beamformer). The downlink steering matrix computed based on such channel estimate, in an embodiment, is represented as:

$$Q_{DL}=f(H_{DL})=f(Q_{UL}{}^T H_{UL}{}^T) \qquad \text{Equation 2}$$

As seen from the above, in this embodiment, if the number of spatial streams $N_{STS\_UL}$ used for transmitting the uplink data unit equals the number of transmit antennas $N_T$ at the beamformee, the beamformer is able to obtain a full dimensional channel matrix H and to thereby compute a full dimensional downlink mapping matrix $Q_{DL}$. In this case, channel estimation based on the non-sounding uplink data unit is equivalent to a channel estimate that can be obtained from a sounding packet that fully sounds the communication channel. On the other hand, if the number of spatial streams $N_{STS\_UL}$ used for transmitting the uplink data unit is less than the number of transmit antennas $N_T$ at the beamformee, then the beamformer cannot obtain a full dimensional channel estimate based on the uplink data unit. A case of $N_{STS\_UL} < N_T$ is sometimes referred to herein as an "insufficient sounding" case. Because the steering matrix is computed based on a partial channel estimate, only partial beamforming gain is obtained for downlink data units transmitted using one to $N_{STS\_UL}$ spatial streams in an insufficient sounding case, according to an embodiment. Further, in an embodiment, downlink data units transmitted using a number of spatial streams greater than $N_{STS\_UL}$ are transmitted omni-directionally because a downlink steering matrix for such data units cannot be determined in the insufficient sounding case. As a result, in some such situations, data units transmitted in close and/or in mid range communications generally do not benefit from beamforming gain because such data units are typically transmitted in the downlink direction using a maximum number of available spatial streams to achieve high data rates generally associated with close to mid range communications, while uplink data units in such situations are not necessarily transmitted using all available spatial streams.

Similarly, full beamforming gain is not achieved in a situation in which a larger bandwidth downlink data packet is transmitted using a steering matrix computed based on an uplink data packet transmitted in a smaller bandwidth, according to an embodiment. As an example, in an embodiment, in a 20/40 MHz basic service set (BSS) 802.11n communication system, full beamforming gain for a 40 MHz downlink data unit cannot be achieved using a channel estimate computed based on a 20 MHz uplink data unit. In particular, according to an embodiment, a steering matrix computed based on a 20 MHz uplink data unit will provide beamforming gain only in the portion of the 40 MHz channel that corresponds to the 20 MHz band in which the uplink data unit used for developing the steering matrix had been transmitted. For example, in orthogonal frequency division multiplexing case, a steering matrix computed based on a 20 MHz uplink data unit provides gain for data tones corresponding to the 20 MHz half of the 40 MHz band that corresponds to the 20 MHz uplink channel in which the uplink data unit used for channel estimation had been transmitted, and may not provide any beamforming gain for data tones corresponding to the other half of the 40 MHz channel at least in some situations. In some such embodiments and/or scenarios, rather than applying a partial steering matrix to downlink data units, the AP 14 does not apply a steering matrix to 40 MHz transmissions at all, thereby entirely forgoing potential beamforming gain.

To improve beamforming performance with implicit beamforming, in some embodiments, Station A does not use every uplink data unit received from Station B for developing a steering matrix, but selects uplink data units to be used in steering matrix computation according to one or several selection criteria. For example, in an embodiment, Station A utilizes a selection filter to select received uplink data units for use in implicit beamforming according to certain selection criteria. As described in more detail below, in various embodiments and/or scenarios, such criteria are based at least in part on, for example, the bandwidth of the communication channel being used by Station A for downlink transmissions to Station B, spatial stream capabilities of Station B, a combination of the two, and/or any other suitable criteria for selecting uplink data units to be used in developing a steering matrix for transmissions to Station B. In general, according to an embodiment, a beamformer (Station A) receives an uplink data unit from a beamformee (Station B) and determines whether the received uplink data unit satisfies one or more criteria for selecting uplink data units to be used in an implicit beamforming procedure. The a particular selection criterion is fixed, according to one embodiment. In another embodiment, a particular selection criterion is determined dynamically, for example, based on the quality of the communication channel, the range (or distance) of the beamformee with respect to the beamformer, a combination of the two, and/or any other suitable factor or combination of factors.

In some embodiments, uplink data unit selection criteria for selecting uplink data units to be used for implicit beamforming computations relates to channel bandwidth. A selection criterion relating to channel bandwidth is sometimes referred to herein as a "channel bandwidth criterion." In some such embodiments, the AP 14 selects uplink data units to be used in steering matrix computation based on the channel bandwidth being utilized for downlink transmissions to the client station for which the beamforming procedure is being performed. Referring to FIG. 1, in an example embodiment in which the AP 14 selects uplink data units for steering matrix computation using the channel bandwidth criterion, if the AP 14 operates in a 40/20 MHz BSS and utilizes a 40 MHz bandwidth for communication with the client station 25-1, the AP 14 then selects only 40 MHz uplink data units to be used in steering matrix computation for the client station 25-1. In this embodiment, 20 MHz uplink data units that the AP 14 receives from the client station 25-1 are not used (e.g., are filtered out by a selection filter or not selected) for steering matrix computation for the client station 25-1. In this case, in an embodiment, the AP 14 continues applying a steering matrix computed based on a 40 MHz uplink data unit previously received from the client station 25-1 to signals transmitted to the client station 25-1 until the next 40 MHz uplink data unit from the client station 25-1 is received, and updates the steering matrix based on the next received 40 MHz data unit. As another example, if the AP 14 operates in an 80/40/20 MHz BSS and utilizes an 80 MHz channel for downlink transmissions to the client station 25-1, the AP 14 the selects only 80 MHz uplink data units from the client station 25-1 for steering matrix computation, according to an embodiment. Thus, in this embodiment, 20 MHz and 40 MHz uplink data units from the client station 25-1 are not used for downlink steering matrix computation for the client station 25-1. For example, in this embodiment, 20 MHz and 40 MHz uplink data units are filtered out by a selection filter.

Additionally or alternatively, in some embodiments, uplink data unit selection criteria for selecting uplink data units to be used for steering matrix computation is based on a number of spatial streams. A selection criterion based on a number of spatial streams is sometimes referred to herein as a "spatial streams criterion." In some such embodiments, the AP 14 selects uplink data units to be used in steering matrix computation based on a maximum number of spatial streams supported by the client station and/or a number of spatial streams generally used by the client station for uplink transmission to the AP 14. Referring again to FIG. 1, in an example embodiment in which the AP 14 selects uplink data units for steering matrix computation using the spatial stream criterion, if the client station 25-1 supports up to two spatial streams, the AP 14 selects only two spatial stream uplink data units (i.e., data units transmitted using two spatial streams) received from the client station 25-1. Uplink data units transmitted by the client station 25-1 using one spatial stream are not selected (e.g., are filtered out by a selection filter or not selected) for steering matrix computation, in this embodiment. In this case, assuming that the number of spatial streams that the client station 25-1 supports corresponds to the number transmit antennas at the client station 25-1, this technique ensures that the steering matrix is always based on a full dimensional estimate of the communication channel between the AP 14 and the client station 25-1, generally improving beamforming performance compared to a situation in which beamsteering for a downlink data unit is performed using a partial estimate of the channel. In some embodiments, however, the maximum number of spatial streams supported by the client station 25-1 is less than the number of antennas 34. For example, in some embodiments, the number of transceivers 30 is less than the number of antennas 34.

As another example of using number of spatial streams as a selection criterion, in an embodiment, if the client station 25-1 supports up to three spatial streams, the AP 14 selects only uplink data units transmitted by the client station 25-1 using three spatial streams, again ensuring that a full dimensional estimate is obtained if the maximum number of spatial streams supported by the client station 25-1 is the same as the number of antennas 34. Alternatively, the AP 14 selects uplink data units transmitted by the client station 25-1 using either two or three spatial streams, in another embodiment. In this embodiment, partial channel estimates determined based on two spatial stream uplink data units are used for steering matrix computation at least in some situations, but partial channel estimates based on uplink data units transmitted by the client station 25-1 using only one spatial stream are not used (e.g., are filtered out by a selection filter).

In some embodiments and/or scenarios, AP 14 utilizes fixed selection criterion or criteria for selecting uplink data units. Alternatively, in some embodiments, certain selection criterion or criteria are determined dynamically during operation, based on real-time packet monitoring, for example. For example, in an embodiment, the AP 14 dynamically determines the specific number (or numbers) of spatial streams to be used for the spatial streams criterion based, for example, on a measured signal strength corresponding to one or more uplink data units that the AP 14, in operation, receives from the client station 25-1. In another embodiment, the AP 14 dynamically determines the specific number (or numbers) or spatial streams to be used for the spatial streams criterion based on monitoring the numbers of spatial streams that the client station 25-1 uses for transmitting uplink data packets over a period of time.

As an example of dynamically determining the selection criteria, in an embodiment in which the AP 14 includes three antennas and the client station 25-1 supports up to three spatial streams, the AP 14 determines dynamically whether to select only three spatial stream uplink data units or to select either two spatial stream uplink data units or three spatial stream uplink data units. For example, in some embodiments, the AP 14 compares signal strength corresponding to one or more uplink data units received from the client station 25-1 to a threshold level and dynamically determines the selection criteria based on the comparison. In one such embodiment, if measured signal strength is above the threshold level, then the AP 14 decides that the client station 25-1 is operating in close-range and, in anticipation of some or all close-range uplink data units to be transmitted by the client station 25-1 using a maximum number of supported spatial streams (in this embodiment, three spatial streams corresponding to three antennas at the client station 25-1), sets the spatial stream criterion to selecting only uplink data units transmitted using the maximum number of spatial streams (e.g., three spatial streams supported by the client station 25-1). On the other hand, if the received signal strength is below the threshold level, then the AP 14 anticipates receiving at least some two stream uplink data units, and sets the spatial stream selection criterion accordingly to select uplink data units transmitted using either two or three spatial streams, according to an embodiment. In an embodiment, the determination of spatial stream selection criterion based on signal strength is performed periodically to adapt to varying channel conditions and/or changes in the range (or the distance) of the client station 25-1 with respect to AP 14.

In another embodiment, the AP 14 dynamically determines the spatial stream selection criterion by determining the numbers of spatial stream associated with each uplink data unit that the AP 14 receives from the client station 25-1 in a certain monitoring window of duration T. For example, in an embodiment, if during the monitoring window of duration T at least a certain minimum number N of three stream uplink data units is received, then the AP 14 sets the spatial stream selection criterion to selecting only three stream uplink data units. On the other hand, if less than N three stream uplink data packets is received, then the AP 14 sets the spatial streams selection criterion to selecting uplink data units transmitted using two or three spatial streams. In an embodiment, one or both of the parameters T and N is adjustable based on, for example, current channel conditions, packet error rate, or any other suitable criteria.

In some embodiments, the AP 14 conducts an implicit beamforming procedure that is substantially, but not completely, transparent to the client station 25-1. For example, the AP 14 and the client station 25-1 are provided by the same manufacturer and support a proprietary method for exchanging certain communication frames, according to one embodiment. In one such embodiment, the client station 25-1 periodically transmits a certain number of uplink data units that include training data that allows the AP 14 to obtain a full dimensional estimate of the communication channel between the AP 14 and the client station 25-1. For example, in an embodiment, the client station 25-1 periodically transmits an uplink data unit using the maximum number of spatial streams supported by the client station 25-1, for example using all transmit antennas available at the clients station 25-1. In an embodiment, the client station 25-1 transmits a minimum number of M such uplink data units, using a maximum number of spatial streams, in every time period of duration T. As an example, if the client station 25-1 supports up to three spatial streams, and the client station 25-1 knows or determines that the AP 14 includes three or more antennas e.g., four, five, six antennas or any other suitable number of antennas greater than three, then the client station 25-1 transmits M three spatial stream uplink data units within every time period of duration T, for example, within every 6 seconds. In some embodiments embodiment, one or both of the parameters T and M is adjustable.

In some embodiments, when the client station 25-1 is communicating with the AP 14 using a number of spatial streams that is less than the maximum number of spatial streams that the client station 25-1 supports, the minimum number M of uplink data units transmitted by the client station 25-1 using the maximum number of spatial streams are transmitted using a suitably low order modulation resulting in a suitable low data rate to maintain desired signal reliability during transmission of the full dimensional uplink data units. As an example, a client station which supports up to three spatial streams and operates according to the IEEE 802.11n Standard, in an embodiment, transmits such three stream uplink data units using MCS number 16, MCS number 17, MCS number 18, or another suitable MCS that specifies a suitably low modulation order for three spatial stream transmission.

For ease of explanations, in the example embodiments described above, communication channels generally include a number of spatial streams that is equal to or less than three. However, the disclosed beamforming techniques are not limited to a maximum of three spatial streams. In general, the disclosed beamforming techniques are used in embodiments and/or scenarios with communication channels that include any suitable number of spatial streams, e.g., 2, 3, 4, 5, 6, 7, 8, etc. spatial streams.

Figure 4:
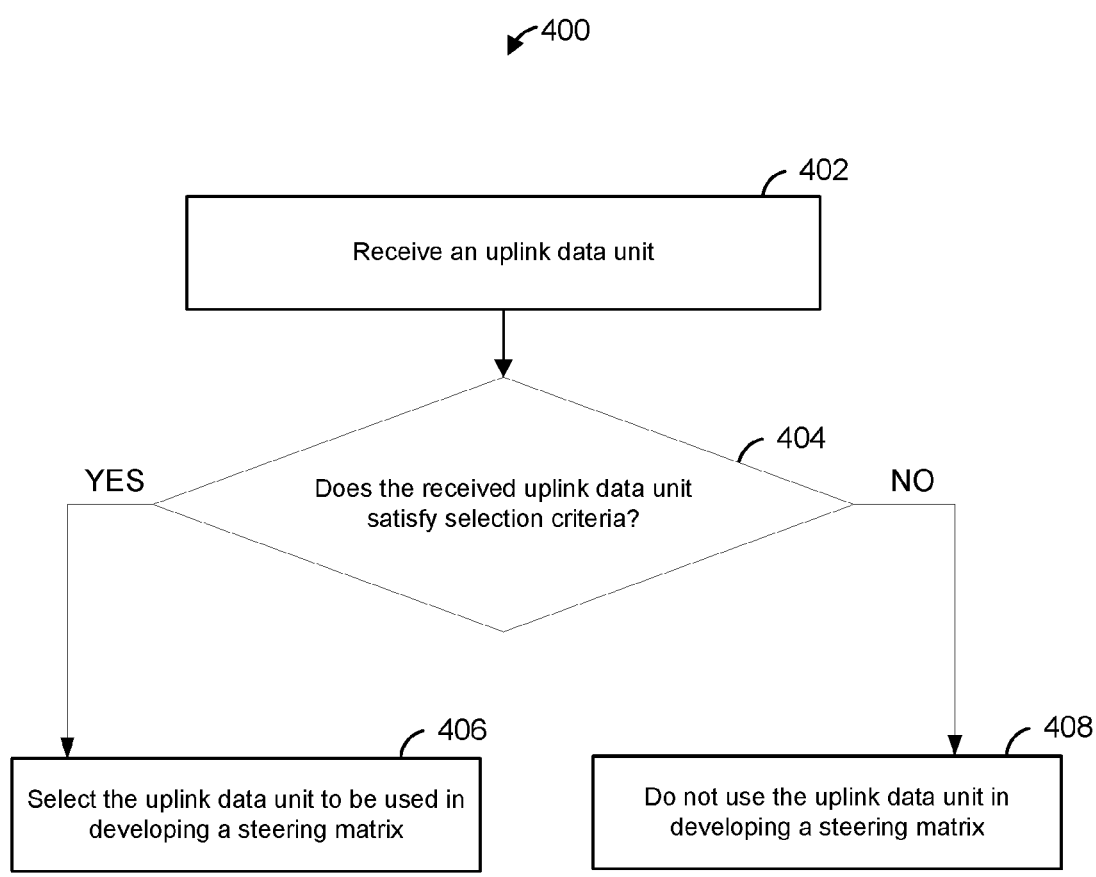
FIG. 4 is a flow diagram of an example method for beamforming in a wireless communication system, according to an embodiment.

FIG. 4 is a flow diagram of an example method 400 of beamforming in a MIMO communication system, according to an embodiment. With reference to FIG. 1, the method 400 is implemented by the AP 14, according to some embodiments. For example, in some embodiments, the method 400 is implemented by the network interface 16. In one such embodiment, the PHY processing unit 20 is configured to implement the method 400. According to another embodiment, the MAC processing unit 18 is also configured to implement at least a part of the method 400. With continued reference to FIG. 1, in yet another embodiment, the method 400 is implemented by the network interface 27 (e.g., the PHY processing unit 29 and/or the MAC processing unit 28). In other embodiments, the method 400 is implemented by other suitable network interfaces and/or other suitable communication devices.

At block 402, the AP 14 receives an uplink data unit from a client station (e.g., the client station 25-1). In an embodiment, the uplink data unit received at block 402 is a non-sounding data unit (e.g, a data unit not specifically intended for sounding a communication channel, a data unit not transmitted in response to a request to transmit a sounding data unit, etc.). At block 404, the AP 14 determines whether the uplink data unit received at block 402 satisfies one or several selection criteria for using the uplink a data unit in a steering matrix computation. In one embodiment, a selection criterion used at block 404 relates to a number of spatial streams associated with the uplink data unit received at block 402. For example, in one embodiment, the uplink data unit satisfies the selection criteria at block 404 if the number of spatial streams associated with the uplink data unit is equal to the maximum number of spatial streams supported by the client station 25-1. Additionally or alternatively, in another embodiment, the selection criteria used at block 404 allows an uplink data unit to be selected if the number of spatial streams associated with the uplink data unit a suitable number that is less than the maximum number of spatial streams supported by the client station 25-1. For example, in one embodiment, the uplink data unit satisfies the selection criteria at block 404 if the number of spatial streams associated with the uplink data unit is equal to or greater than the maximum number of spatial streams supported by the client station 25-1 minus one. As another example, in one such embodiment, if the client station 25-1 supports a maximum of three spatial streams, then the selection criteria used at block 404 allows uplink data units having three or two spatial streams to be selected for steering matrix computations. Additionally or alternatively, in another embodiment, a selection criterion used at block 404 relates to the channel bandwidth being utilized by the AP 14 for downlink transmission to the client station 25-1. In some embodiments, the selection criteria used at block 404 relates to both the number of spatial streams and the channel bandwidth. In some embodiments, one or more selection criteria used at block 404 are determined dynamically during operation, based on, for example, channel quality of the communication channel between the AP 14 and the client station 25-1, the range (or the distance) of the client station 25-1 with respect to the AP 14, or based on one or more other suitable criteria.

If it is determined at block 404 that the uplink data unit satisfies the selection criteria, then the method proceeds to block 406 where the uplink data unit is selected to be used in developing a steering matrix to be applied to signals to be transmitted to the client station 25 by the AP 14. On the other hand, if it is determined at block 408 that the uplink data unit does not satisfy the selection criteria, then the method proceeds to block 408 where it is decided that the uplink data unit received at block 402 should not be used for steering matrix computation. In an example embodiment, in this case, a steering matrix determined using a previously received uplink data unit is used for beamsteering until a next data unit that satisfies the selection criteria is received. In other words, according to this embodiment, the steering matrix determined based on a previous uplink data unit is not updated based on an uplink data unit that does not satisfy the selection criteria.

Figure 5:
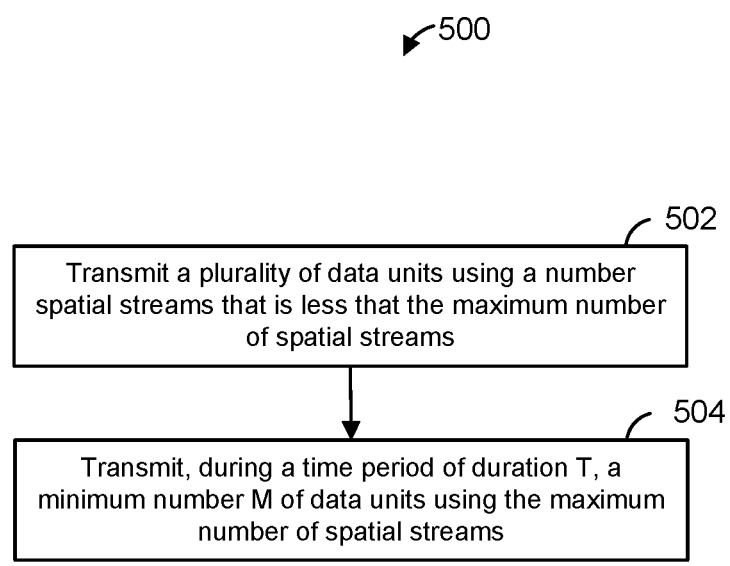
FIG. 5 is a flow diagram of an example method, according to an embodiment.

FIG. 5 is a flow diagram of an example method 500, according to an embodiment. With reference to FIG. 1, the method 500 is implemented by the AP 14, according to some embodiments. For example, in some embodiments, the method 500 is implemented by the network interface 16. In one such embodiment, the PHY processing unit 20 is configured to implement the method 500. According to another embodiment, the MAC processing unit 18 is also configured to implement at least a part of the method 500. With continued reference to FIG. 1, in yet another embodiment, the method 500 is implemented by the network interface 27 (e.g., the PHY processing unit 29 and/or the MAC processing unit 28). In other embodiments, the method 500 is implemented by other suitable network interfaces and/or other suitable communication devices.

According to block 502, the client station 25-1 transmits to the AP 14 a plurality of data units using a number of spatial streams that is less than the maximum number of spatial streams supported by the client station 25-1. For example, in an embodiment, the client station 25-1 includes three antennas 24 and supports a maximum of three spatial streams. In this embodiment, at block 502, the client station 25-1 transmits to the AP 14 a plurality of data units using a number of spatial streams that is less than the maximum number of spatial streams supported by the client station 25-1, for example using two transmit antennas and two spatial streams.

According to block 504, during a time period of duration T, the client station 25-1 transmits to the AP 14 a minimum number M of data units using the maximum number of spatial streams supported by the client station 25-1. For example, in an embodiment in which the client station 25-1 includes three antennas 24 and supports a maximum of three spatial streams, the minimum number M of data units at block 504 are transmitted using three spatial streams. In some embodiments, one or both of T and M of block 504 are adjustable, for example based on channel conditions, or according to another suitable factor. In an embodiment, the minimum M of data units transmitted at block 504 are transmitted using an MCS that corresponds to a suitably low data rate to maintain system reliability when the data units are transmitted using the maximum number of spatial streams. In some embodiments, the client station 25-1 utilizes a first MCS to transmit the plurality of data units at block 502 and a second MCS to transmit the minimum number M of data units at block 504, where the first MCS is different from the second MCS. In one such embodiment, the MCS used at block 504 corresponds to a data rate that is lower compared to the data rate that corresponds to the MCS used at block 502.

In some embodiments, the AP 14 receives the minimum of M data units transmitted at block 504 and utilizes these data units to obtain full-dimensional channel estimates of the communication channel between the AP 14 and the client station 25-1. In an embodiment, the AP 14 utilizes the full-dimensional channel estimates in developing steering matrices for use in downlink transmissions to the client station 25-1.

At least some of the various blocks, operations, and techniques described above may be implemented utilizing hardware, a processor executing firmware instructions, a processor executing software instructions, or any combination thereof.

When implemented in hardware, the hardware may comprise one or more of discrete components, an integrated circuit, an application-specific integrated circuit (ASIC), a programmable logic device (PLD), etc.

When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

While the present invention has been described with reference to specific examples, which are intended to be illustrative only and not to be limiting of the invention, changes, additions and/or deletions may be made to the disclosed embodiments without departing from the scope of the invention. For example, one or more portions of methods or techniques described above may be performed in a different order (or concurrently) and still achieve desirable results.

What is claimed is:

1. A method for signal processing in a multiple input multiple output (MIMO) communication system, the method comprising:
   receiving, at a first communication device, a plurality of first data units from a second communication device;
   determining, at the first communication device, a first subset of the plurality of first data units that satisfy one or more selection criteria corresponding to suitability for use in developing channel estimates of a MIMO communication channel between the first communication device and the second communication device, wherein the one or more selection criteria correspond to at least one of i) a bandwidth, and ii) a quantity of spatial streams, and wherein a second subset of the plurality of first data units does not satisfy the one or more selection criteria;
   developing, at the first communication device, a plurality of channel estimates of the MIMO communication channel using the first subset of the plurality of first data units; and
   using, at the first communication device, the plurality of channel estimates of the MIMO communication channel to process, at the first communication device, communication signals.

2. The method of claim 1, wherein developing the plurality of channel estimates comprises:
   developing an estimate of a reverse MIMO communication channel using one of the plurality of first data units in the first subset; and
   developing an estimate of a forward MIMO communication channel based on the estimate of the reverse MIMO channel.

3. The method of claim 2, wherein using the plurality of channel estimates to process communication signals comprises:
   developing a steering matrix to perform beamforming in the forward MIMO communication channel based on the estimate of the forward MIMO communication channel.

4. The method of claim 1, wherein the one or more selection criteria corresponding to suitability for use in developing channel estimates of the MIMO communication channel comprise:
   whether a bandwidth of a first data unit is equal to a determined channel bandwidth.

5. The method of claim 1, wherein the one or more selection criteria corresponding to suitability for use in developing channel estimates of the MIMO communication channel comprise:
   whether a number of spatial streams that was utilized to transmit a first data unit is equal to a determined number of spatial streams.

6. The method of claim 5, further comprising dynamically determining the determined number of spatial streams based on a channel quality of a reverse MIMO communication channel via which the plurality of first data units are received;
   wherein the determined number of spatial streams is higher for a first channel quality than for a second channel quality, where the first channel quality is higher than the second channel quality.

7. The method of claim 5, further comprising dynamically determining the determined number of spatial streams based on a distance between the first communication device and the second communication device;
   wherein the determined number of spatial streams is higher for the distance being in a first range than for the distance being in a second range, where the second range is larger than the first range.

8. The method of claim 5, further comprising dynamically determining the determined number of spatial streams based on a signal strength associated with one or more first data units received from the second communication device;
   wherein the determined number of spatial streams is higher for the signal strength being above a threshold than for the signal strength being below the threshold.

9. The method of claim 8, further comprising:
   periodically performing, at the first communication device, a determination of the signal strength associated with the one or more first data units received from the second communication device.

10. The method of claim 5, further comprising:
    determining a number of first data units (i) that were received from the second communication device during a time period of a certain duration, and (ii) that were transmitted using at least a certain number of spatial streams; and
    setting the determined number of spatial streams based on the determined number of first data units.

11. An apparatus, comprising:
    a network interface device associated with a first communication device, the network interface implemented on one or more integrated circuit devices configured to:
       determine a first subset of a plurality of first data units, received from a second communication device, that satisfy one or more selection criteria corresponding to suitability for use in developing channel estimates of a multiple input, multiple output (MIMO) communication channel between the first communication device and the second communication device, wherein the one or more selection criteria correspond to at least one of i) a bandwidth, and ii) a quantity of spatial streams, and wherein a second subset of the plurality of first data units does not satisfy the one or more selection criteria, develop a plurality of channel estimates of the MIMO communication channel using the first subset of the plurality of first data units, and use the plurality of channel estimates of the MIMO communication channel to process communication signals.

12. The apparatus of claim 11, wherein the one or more integrated circuit devices are configured to:

develop an estimate of a reverse MIMO communication channel using one of the plurality of first data units in the first subset; and develop an estimate of a forward MIMO communication channel based on the estimate of the reverse MIMO channel.

13. The apparatus of claim 12, wherein the one or more integrated circuit devices are configured to:

develop a steering matrix to perform beamforming in the forward MIMO communication channel based on the estimate of the forward MIMO communication channel.

14. The apparatus of claim 11, wherein the one or more selection criteria corresponding to suitability for use in developing channel estimates of the MIMO communication channel comprise:

whether a bandwidth of a first data unit is equal to a determined channel bandwidth.

15. The apparatus of claim 11, wherein the one or more selection criteria corresponding to suitability for use in developing channel estimates of the MIMO communication channel comprise:

whether a number of spatial streams that was utilized to transmit a first data unit is equal to a determined number of spatial streams.

16. The apparatus of claim 15, wherein the one or more integrated circuit devices are configured to dynamically determine the determined number of spatial streams based on a channel quality of a reverse MIMO communication channel via which the plurality of first data units are received;

wherein the determined number of spatial streams is higher for a first channel quality than for a second channel quality, where the first channel quality is higher than the second channel quality.

17. The apparatus of claim 15, wherein the one or more integrated circuit devices are configured to dynamically determine the determined number of spatial streams based on a distance between the first communication device and the second communication device;

wherein the determined number of spatial streams is higher for the distance being in a first range than for the distance being in a second range, where the second range is larger than the first range.

18. The apparatus of claim 15, wherein the one or more integrated circuit devices are configured to dynamically determine the determined number of spatial streams based on a signal strength associated with one or more first data units received from the second communication device;

wherein the determined number of spatial streams is higher for the signal strength being above a threshold than for the signal strength being below the threshold.

19. The apparatus of claim 18, wherein the one or more integrated circuit devices are configured to:

periodically perform a determination of the signal strength associated with the one or more first data units received from the second communication device.

20. The apparatus of claim 15, wherein the one or more integrated circuit devices are configured to:

determine a number of first data units (i) that were received from the second communication device during a time period of a certain duration, and (ii) that were transmitted using at least a certain number of spatial streams; and set the determined number of spatial streams based on the determined number of first data units.

21. The apparatus of claim 11, wherein the network interface further comprises:

a plurality of transceivers implemented on the one or more integrated circuit devices.

22. The apparatus of claim 21, further comprising a plurality of antennas coupled to the plurality of transceivers.

* * * * *